(12) United States Patent
Huang

(10) Patent No.: US 7,558,973 B2
(45) Date of Patent: Jul. 7, 2009

(54) BLADE SERVER EQUIPPED WITH HOT PLUG FUNCTION

(75) Inventor: Yung-Hsin Huang, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 567 days.

(21) Appl. No.: 11/483,723

(22) Filed: Jul. 11, 2006

(65) Prior Publication Data
US 2008/0016375 A1 Jan. 17, 2008

(51) Int. Cl.
*G06F 1/26* (2006.01)
(52) U.S. Cl. ..................... 713/300; 361/644
(58) Field of Classification Search .................. 713/300
See application file for complete search history.

(56) References Cited

U.S. PATENT DOCUMENTS
7,423,870 B2 * 9/2008 Carlisi et al. ........... 361/679.41

FOREIGN PATENT DOCUMENTS
TW 543799 7/2003

* cited by examiner

*Primary Examiner*—Nitin C Patel
(74) *Attorney, Agent, or Firm*—Geissler, Olds & Lowe, PLLC

(57) ABSTRACT

A blade server equipped with hot plug function mainly includes a plurality of small servers which have respectively a logic processing main board and a power adapter card to be electrically connected to the logic processing main board in normal conditions. A power integration panel is provided that has a coupling port to be coupled with a power input port of the power adapter card in a hot plug fashion. Thus a general logic processing main board can be used on a blade server and equipped with hot plug function without the need of fabricating another logic processing main board of a special specification.

4 Claims, 6 Drawing Sheets

BLADE SERVER EQUIPPED WITH HOT PLUG FUNCTION

FIELD OF THE INVENTION

The present invention relates to a blade server equipped with hot plug function and particularly to a blade server that employs a general logic processing main board through an electric power coupling technique to equip with hot plug function.

BACKGROUND OF THE INVENTION

A blade server aims to accommodate a greater number of small server units in a smaller space. It is a server cluster adopting a modular design. The server is thin and formed like a blade, and can be inserted and removed easily. The entire module is like a small box, and the servers are inserted in the box like individual blades. As insertion and removing are easy, expandability is greater. Users can add a number of "blade modules" according to requirements. For instance, a small box originally containing six blade servers can be coupled with another box of six blade servers. Such a modular design has a shorter connection line among the servers than the conventional ones, and also is easier to repair and maintain. To meet the requirements of high speed processing and low operation cost in industries, a new type of blade server has been developed that can hold maximum eight blades in a 4U chassis (1U is 1.75 inches) to equip 64 bits high speed processing power. Such a blade server can minimize IT setup cost and maximize service level. In addition, the blade server can be configured into a "virtual super computer" and is very desirable to be used in academic and research institutions that require huge processing power. For service providers, the blade server can provide various hosting services, such as Server Farm. For content providers, the blade server can be clustered to transmit a great amount of contents. In multimedia industry which has to process a huge amount of information, such as streaming media, the blade server offers a best platform with capability to transmit a great amount of information. The blade server also can substitute or aid many existing server environments that use individual and separated servers. Management and expansion of blade server also is easier. Hence processing resources can be allocated more efficient. In short, due to the blade server adopts centralized management rather than provides a keyboard and a monitor for each set of blade server, server providers can offer and sell more management software. As software usually has a higher gross profit than hardware, the server providers can enjoy a higher profit. Moreover, as the economic condition improves and network machine room space is constrained, enterprises have to save space while meeting the increasing demand. In addition, the blade server can meet the requirement of capacity on demand of enterprises gradually without replacing the entire system. Take into account of all these factors, the blade server will gradually replace the pedestal server which takes more space, and rival the rack mount server.

Patents for blade servers are known in the art. For instance, in R.O.C. patent publication No. 543799, Applicant discloses a "High density server module" in which a plurality of layers of small servers are mounted on a front side and a rear side to form a super computer to process a great amount of data. It mainly includes a holding unit divided into a plurality of casings that have space for holding and unloading small servers, a cooling unit located in the casings and an outer cap covering the upper side of the casings. The server module can be coupled with a plurality of small servers to form a super computer to process huge amount of data.

However, the blade server also has drawbacks: while some server providers have offered relatively open PCI module to be used on PCI add-on card, most still adopt proprietary specifications of blade backplane interfaces. Refer to FIG. 1 for a schematic view of a conventional blade server. It has a chassis with a power supply system on a rear end and a plurality of small servers on a front end. There is a power integration panel interposed between the power supply system and small servers. To maintain uninterrupted power supply while removing and replacing a damaged or targeted small server in a hot plug condition, the existing technique has to provide a power input port on the logic processing main board in the small server mating a coupling port on the power integration panel. It usually adopts a gold finger. But with constant advance of software and hardware, especially CPU and main board for logic processing, the design of the power input port on the logic processing main board under the existing technique for the general server or personal computer cannot be adopted on the small servers of the blade server. Moreover, component providers have to design and fabricate the logic processing main board according to special specifications of one customer, fabrication cost is higher. Without common customers, inventory is limited. For enterprise users, compatibility of the existing IT architecture or future upgrade is a big concern. In the event of malfunction occurs to the logic processing main board, replacement of the logic processing main board could be a big problem. Hence although the blade server has many benefits, it is still not widely adopted among enterprise users. Hence market acceptance of this type of product is still limited.

SUMMARY OF THE INVENTION

The primary object of the present invention is to solve the aforesaid disadvantages. The invention provides a power adapter card in every small server of a blade server that is connected electrically to a logic processing main board in normal conditions. The power adapter card and a power integration panel have respectively a power input port and a coupling port to provide hot plug function. Thereby a general logic processing main board equipped with hot plug function can be installed in the blade server. There is no need to fabricate the logic processing main board of a special specification.

To achieve the foregoing object, the blade server equipped with hot plug function according to the invention includes:

a chassis and a power supply system located in the chassis to provide electric power for operation;

a plurality of small servers located in the chassis in a removable manner. Each of the small servers has at least one independent logic processing main board, and a power adapter card corresponding to the logic processing main board. The power adapter card has a power output port to transmit electric power to the logic processing main board through at least one power cord. The power cord and the logic processing main board have mating connection ports to establish electric connection. The power adapter card also has a power input port; and at least a power integration panel which is electrically connected to the power supply system and the small servers. The power integration panel aims to integrate output power of the power supply system and distribute input power to drive the small servers. The power integration panel also has a coupling port to be coupled with the power input port of the power adapter card in a hot plug fashion.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
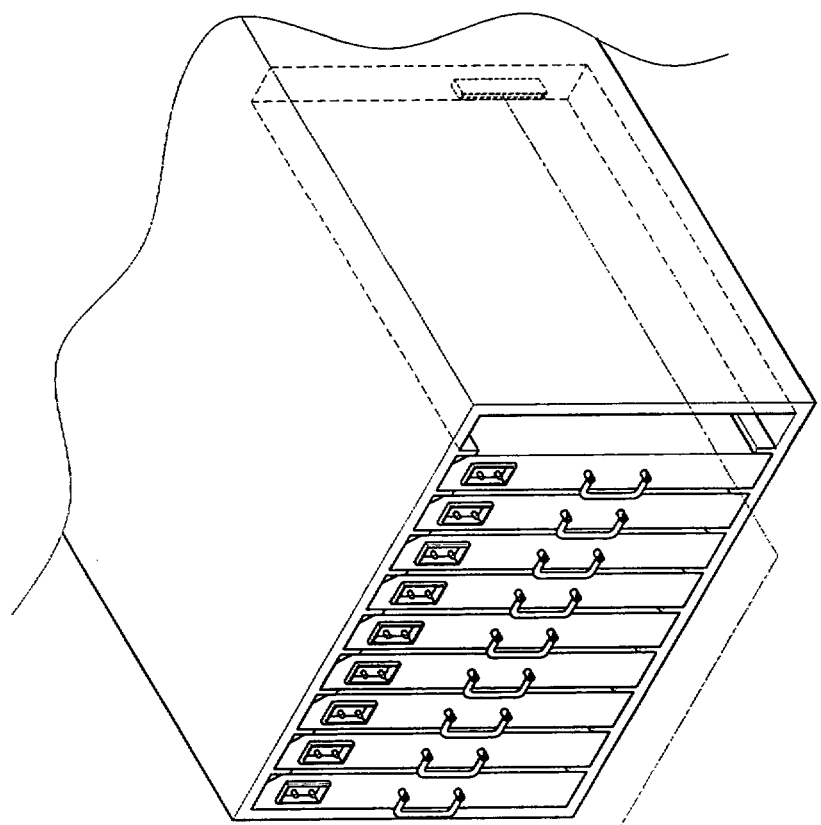
FIG. 1 is a schematic view of a conventional blade server
Figure 1:
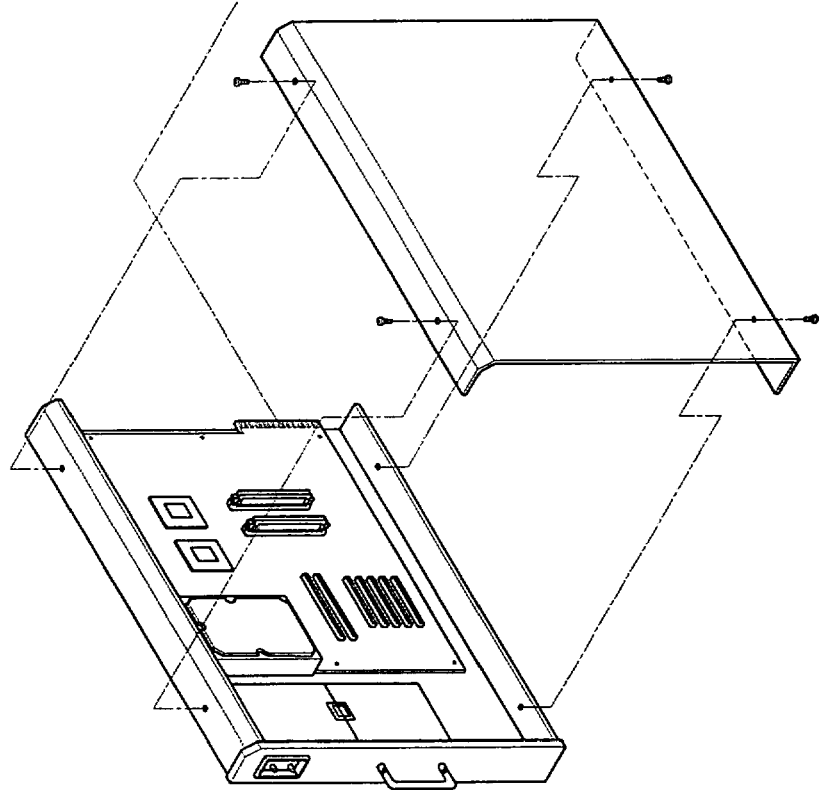
Figure 2:
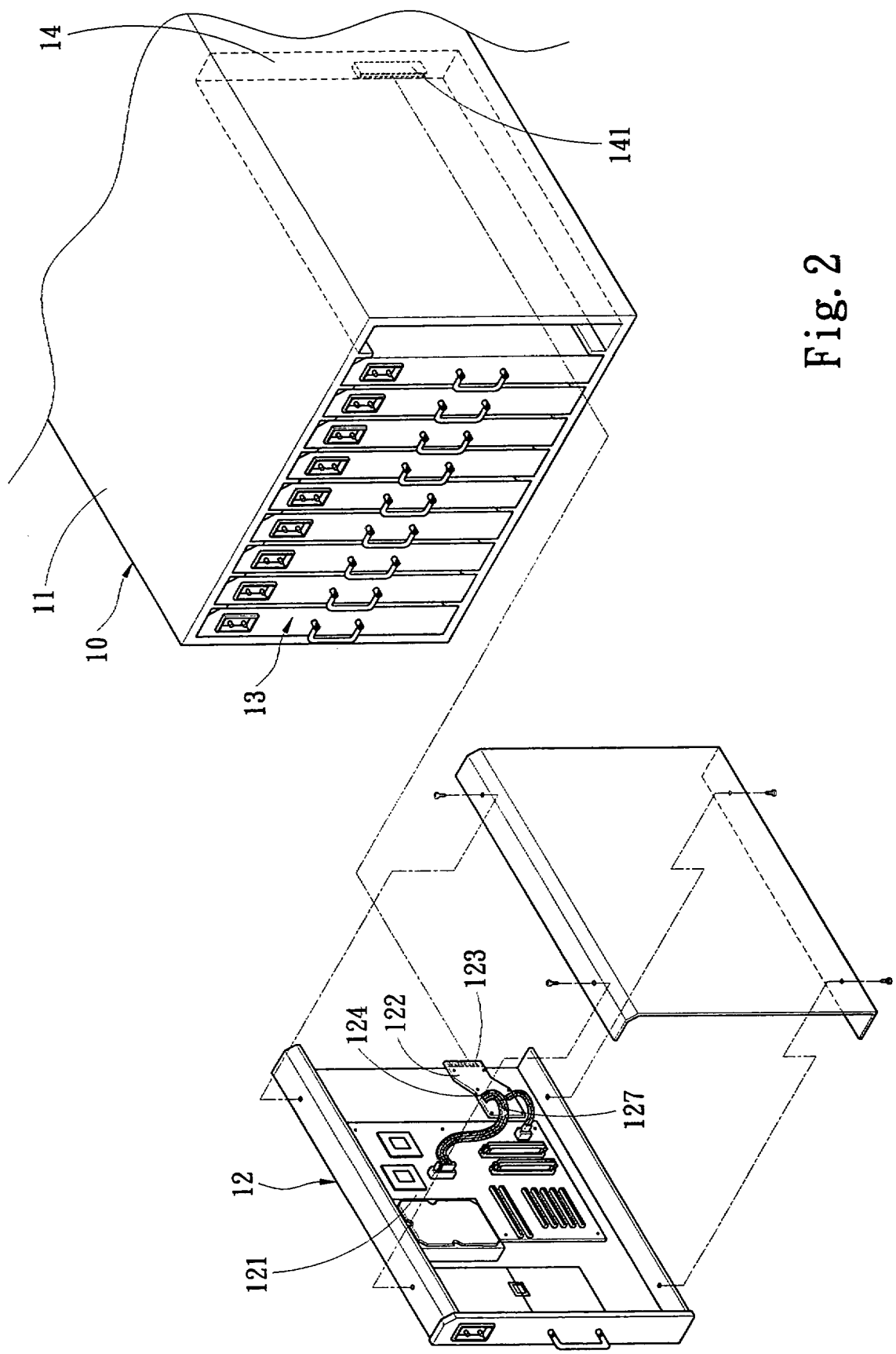
FIGS. 2 and 3 are schematic views of the invention showing main components.
Figure 3:
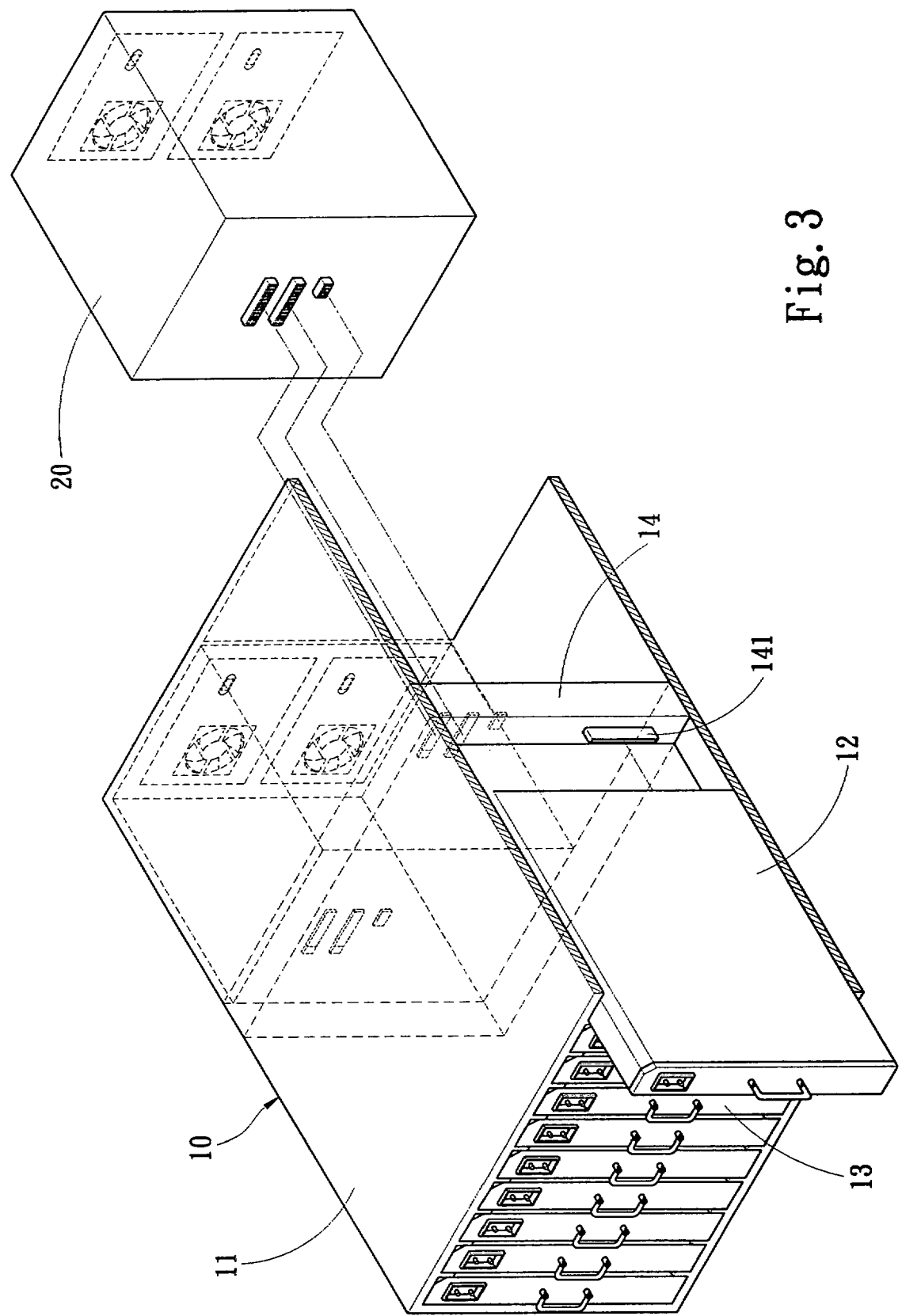
Figure 4:
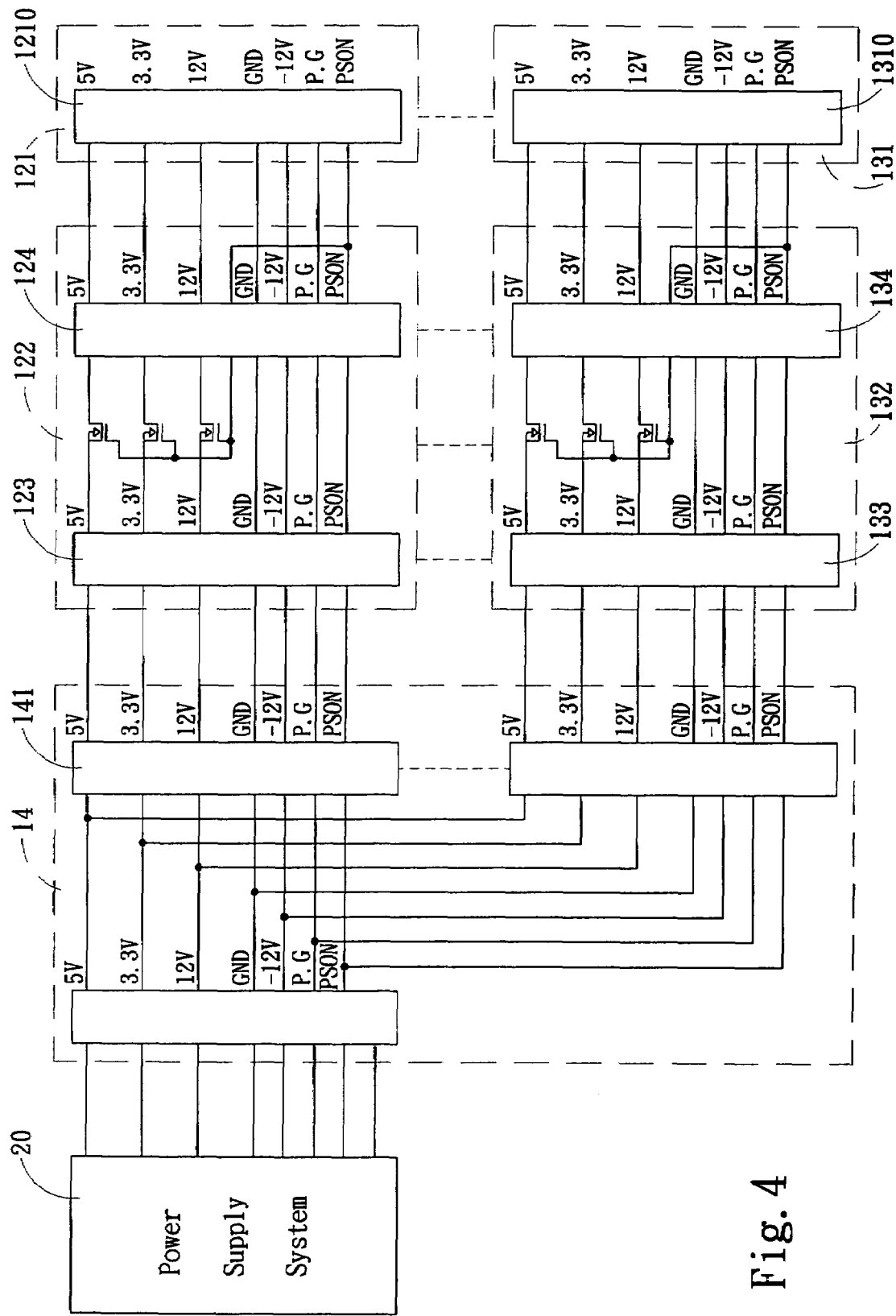
FIG. 4 is a schematic view of the invention showing an electric connecting condition.

Please refer to FIGS. 2, 3 and 4, the blade server 10 equipped with hot plug function according to the invention mainly includes a chassis 11 and a power supply system 20 in the chassis 11 to provide electric power for operation. The chassis 11 has an open end to hold a plurality of removable small servers 12 and 13. Each of the small servers 12 and 13 has at least one logic processing main board 121 and 131, and a power adapter card 122 and 132 corresponding to the logic processing main boards 121 and 131. The power adapter cards 122 and 132 have respectively a power output port 124 and 134 to transmit electric power to the logic processing main boards 121 and 131 through at least one power cord 127. The power cord 127 and the logic processing main boards 121 and 131 have respectively mating connection sockets 1271, 1210 and 1310 for electric connection. The power adapter cards 122 and 132 have respectively a power input port 123 and 133. The chassis 11 further has a power integration panel 14 electrically connecting to the power supply system 20 and the small servers 12 and 13. The power integration panel 14 aims to integrate output power of the power supply system 20 and distribute input power to the small servers 12 and 13. The power integration panel 14 has a coupling port 141 to be connected by the power input ports 123 and 133 of the power adapter cards 122 and 132 in a hot plug fashion.

Figure 5:
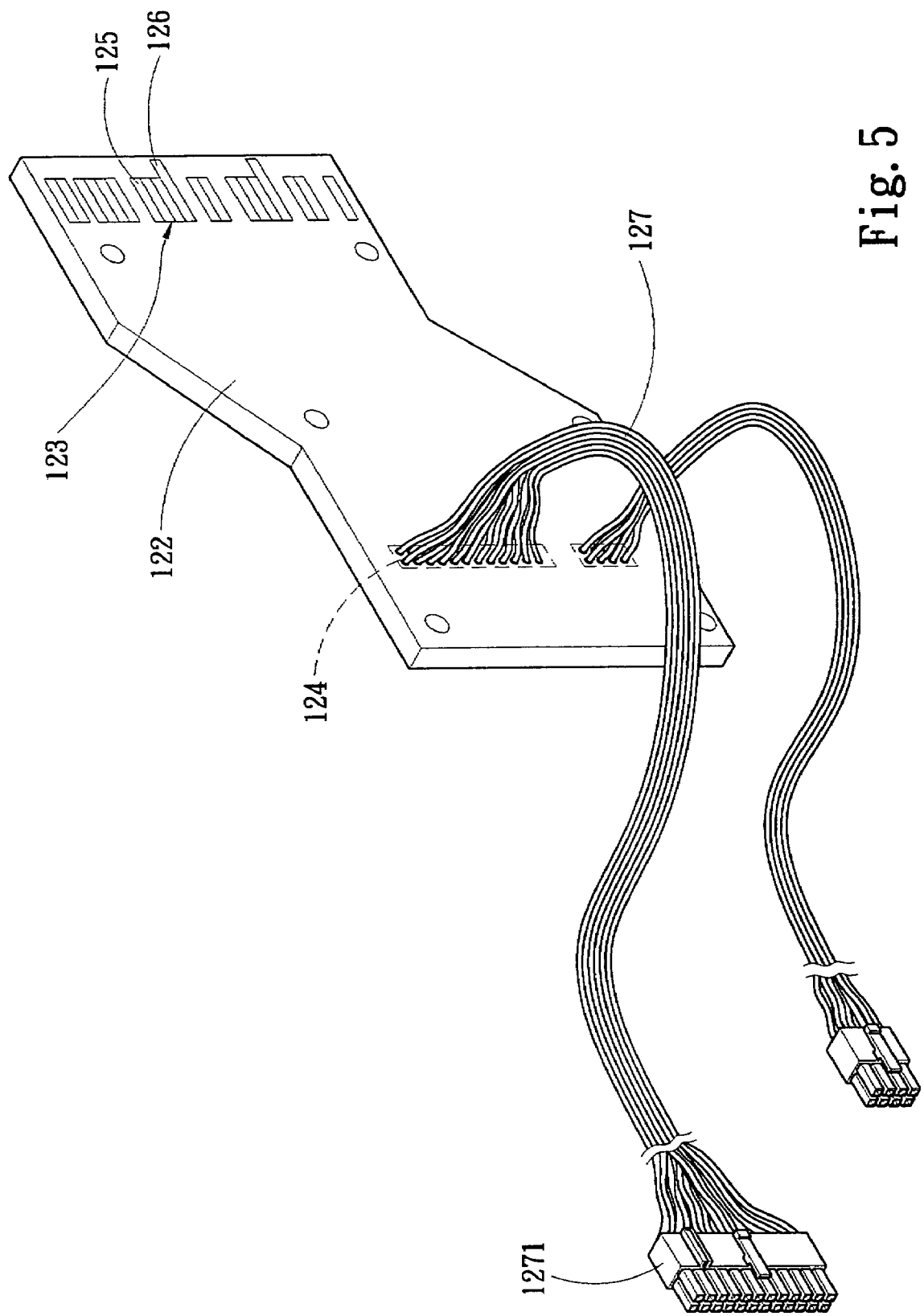
FIG. 5 is a schematic view of a first embodiment of the power adapter card of the invention.
Figure 6:
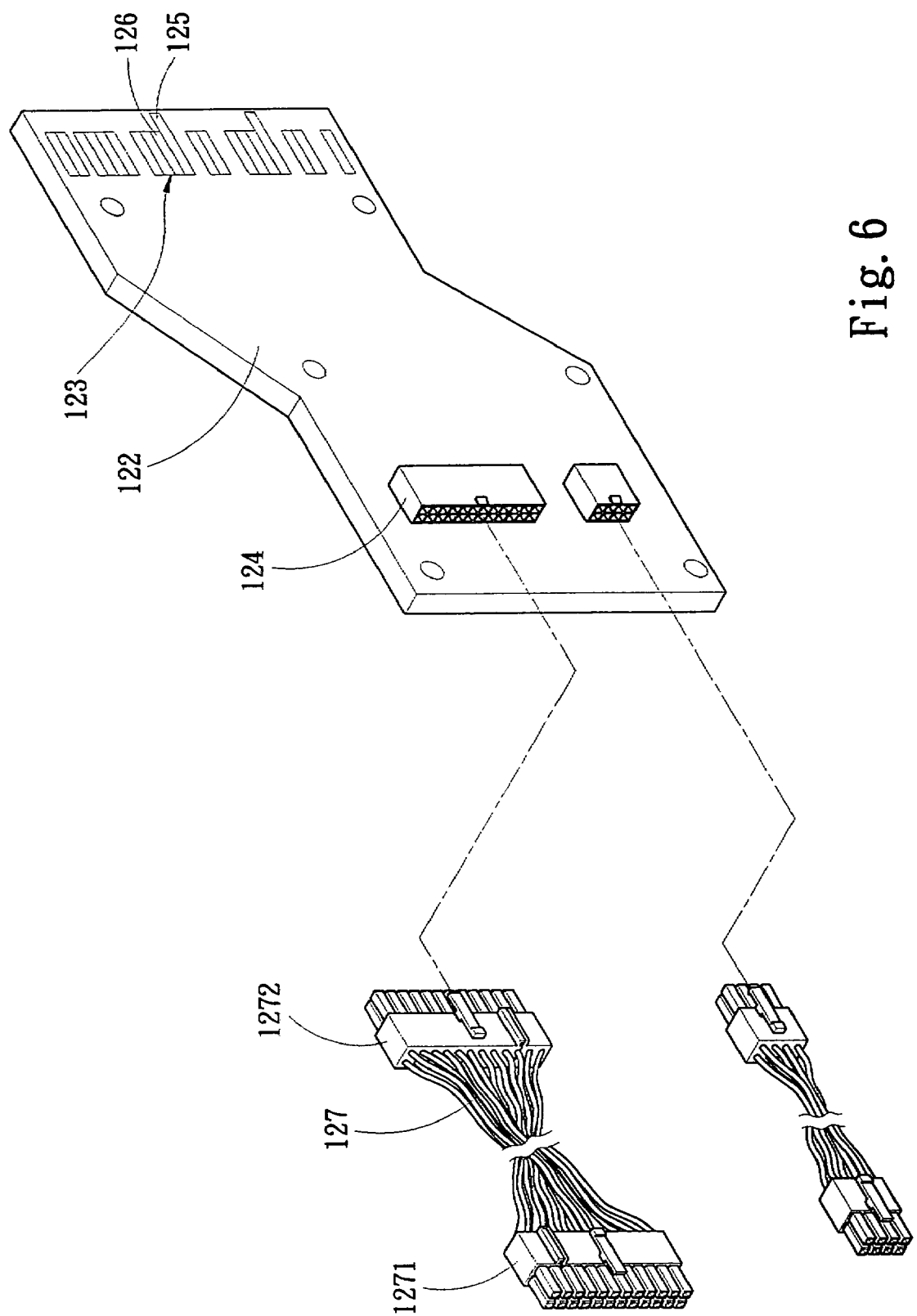
FIG. 6 is a schematic view of a second embodiment of the power adapter card of the invention.

The power input ports 123 and 133 of the power adapter cards 122 and 132 have respectively a high potential pin 125 and a lower potential pin 126. The lower potential pin 126 is spaced from one end of the power input ports 123 and 133 at a distance greater than that of the higher potential pin 125 and the power input ports 123 and 133. Referring to FIG. 5, the power output ports 124 and 134 of the power adapter cards 122 and 132 are electrically connected to the power cord 127 by soldering or by coupling through insertion as shown in FIG. 6. The power cord 127 has a mating connection plug 1272 to be coupled with the power output ports 124 and 134 to establish electric connection. The power adapter cards 122 and 132 are electrically connected to the logic processing main boards 121 and 131 through the power cord 127 in normal conditions.

Referring to FIG. 4, through the invention, the general logic processing main boards 121 and 131 can be used on the small servers 12 and 13. It is to be noted that if the specifications of the logic processing main boards 121 and 131 are changed (such as already in specifications of ATX1.3, ATX2.0, ATX2.2 or BTX), the pin design of the power adapter cards 122 and 132 also has to be changed. FIG. 4 illustrates only the main power pins, and is not the limitation of the invention. As shown in the drawings, the high potential pin 125 and lower potential pin 126 of the power input ports 123 and 133 on the power adapter cards 122 and 132 are designed in a long leg and a short leg manner, when the small servers 12 and 13 are removed, the low potential pin 126 is separated and disconnected first (such as PSON), then the high potential pin 125 is separated and disconnected (such as GND). Therefore when one of the small servers 12 and 13 is removed, system output power does not affect other small servers 12 and 13. Thus an effective hot plug function can be achieved.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A blade server equipped with hot plug function, comprising:
a chassis;
a power supply system located in the chassis to provide electric power for operation;
a plurality of small servers located in the chassis in a removable manner, each of the small servers having at least one independent logic processing main board and a power adapter card corresponding to the logic processing main board, the power adapter card having a power input port and a power output port which transmits electric power to the logic processing main board through at least one power cord, the power cord and the logic processing main board having respectively a mating connection socket to establish electric connection; and
at least one power integration panel electrically connecting to the power supply system and the small servers to integrate output power of the power supply system and distribute input power to drive the small servers, the power integration panel having a coupling port to be coupled by the power input port of the power adapter card in a hot plug fashion.

2. The blade server equipped with hot plug function of claim 1, wherein the power input port of the power adapter card has a high potential pin and a lower potential pin, the lower potential pin being spaced from one end of the power output port at a distance greater than that of the higher potential pin and the power output port.

3. The blade server equipped with hot plug function of claim 1, wherein the power output port of the power adapter card is electrically connected to the power cord by soldering.

4. The blade server equipped with hot plug function of claim 1, wherein the power output port of the power adapter card is electrically connected to the power cord by coupling through insertion, the power cord and the power output ports having mating connection sockets to establish electric connection.

* * * * *